(12) United States Patent
Schmidt et al.

(10) Patent No.: US 11,650,826 B2
(45) Date of Patent: May 16, 2023

(54) METHOD FOR STARTING UP OR SERVICING AN AUTOMATION FIELD DEVICE

(71) Applicant: Endress+Hauser Process Solutions AG, Reinach (CH)

(72) Inventors: Thomas Schmidt, Basel (CH); Nikolai Fink, Aesch (CH)

(73) Assignee: Endress+Hauser Process Solutions AG, Reinach (CH)

( * ) Notice: Subject to any disclaimer, the term of this patent is extended or adjusted under 35 U.S.C. 154(b) by 908 days.

(21) Appl. No.: 16/468,094

(22) PCT Filed: Oct. 30, 2017

(86) PCT No.: PCT/EP2017/077752
§ 371 (c)(1),
(2) Date: Jun. 10, 2019

(87) PCT Pub. No.: WO2018/108375
PCT Pub. Date: Jun. 21, 2018

(65) Prior Publication Data
US 2019/0332388 A1    Oct. 31, 2019

(30) Foreign Application Priority Data

Dec. 13, 2016    (DE) .................... 10 2016 124 146.6

(51) Int. Cl.
*G06F 9/4401* (2018.01)
*G06K 7/14* (2006.01)
(Continued)

(52) U.S. Cl.
CPC ....... *G06F 9/4401* (2013.01); *G05B 19/4183* (2013.01); *G05B 23/00* (2013.01); *G06K 7/1413* (2013.01); *G06K 7/1417* (2013.01)

(58) Field of Classification Search
CPC ........................... G06B 19/4183; G05B 23/00
See application file for complete search history.

(56) References Cited

U.S. PATENT DOCUMENTS

2006/0244565 A1* 11/2006 Friedrich ........... G06K 7/10881
340/572.1
2007/0293952 A1* 12/2007 Callaghan .......... G05B 19/4188
700/9

(Continued)

FOREIGN PATENT DOCUMENTS

DE    102011082002 A1    3/2013
DE    102011084789 A1    4/2013

(Continued)

*Primary Examiner* — Raymond L Nimox
(74) *Attorney, Agent, or Firm* — Mark A. Logan; Endress+Hauser (USA) Holding, Inc.

(57) ABSTRACT

The present disclosure relates to a method for starting up or servicing a field device: reading unique identification information assigned to the field device via a static code by means of a reading and/or operating tool; optically reading diagnostic information stored in the field device and which relates to at least one current and/or past event assigned to the field device, via a dynamic code generated by the field device by means of the reading and/or operating tool; transmitting the identification and diagnostic information from the reading and/or operating tool to a cloud-based service platform, transmitting device and/or application-specific information for remedying the event characterized by the diagnostic information from the cloud-based service platform to the reading and/or operating tool, and eliminating the event or effects of the event using the transmitted device-specific and/or application-specific information.

11 Claims, 1 Drawing Sheet

(51) Int. Cl.
*G05B 23/00* (2006.01)
*G05B 19/418* (2006.01)

(56) References Cited

U.S. PATENT DOCUMENTS

| | | | | |
|---|---|---|---|---|
| 2011/0004685 | A1* | 1/2011 | De Groot | G06F 21/6218 709/225 |
| 2015/0014409 | A1* | 1/2015 | Kuhlmann | G06F 16/9554 235/494 |
| 2015/0046125 | A1* | 2/2015 | Jagiella | G06K 7/10297 702/184 |
| 2015/0106826 | A1* | 4/2015 | Hahniche | G06F 13/102 719/321 |
| 2015/0215321 | A1* | 7/2015 | Fries | G05B 19/4183 726/4 |
| 2015/0287318 | A1* | 10/2015 | Nair | G06Q 10/10 340/5.6 |

FOREIGN PATENT DOCUMENTS

| | | |
|---|---|---|
| DE | 102012019599 A1 | 4/2014 |
| DE | 102012112842 A1 | 6/2014 |
| DE | 102013013365 A1 | 2/2015 |
| EP | 1647869 A2 | 4/2006 |
| WO | 2014023468 A1 | 2/2014 |

\* cited by examiner

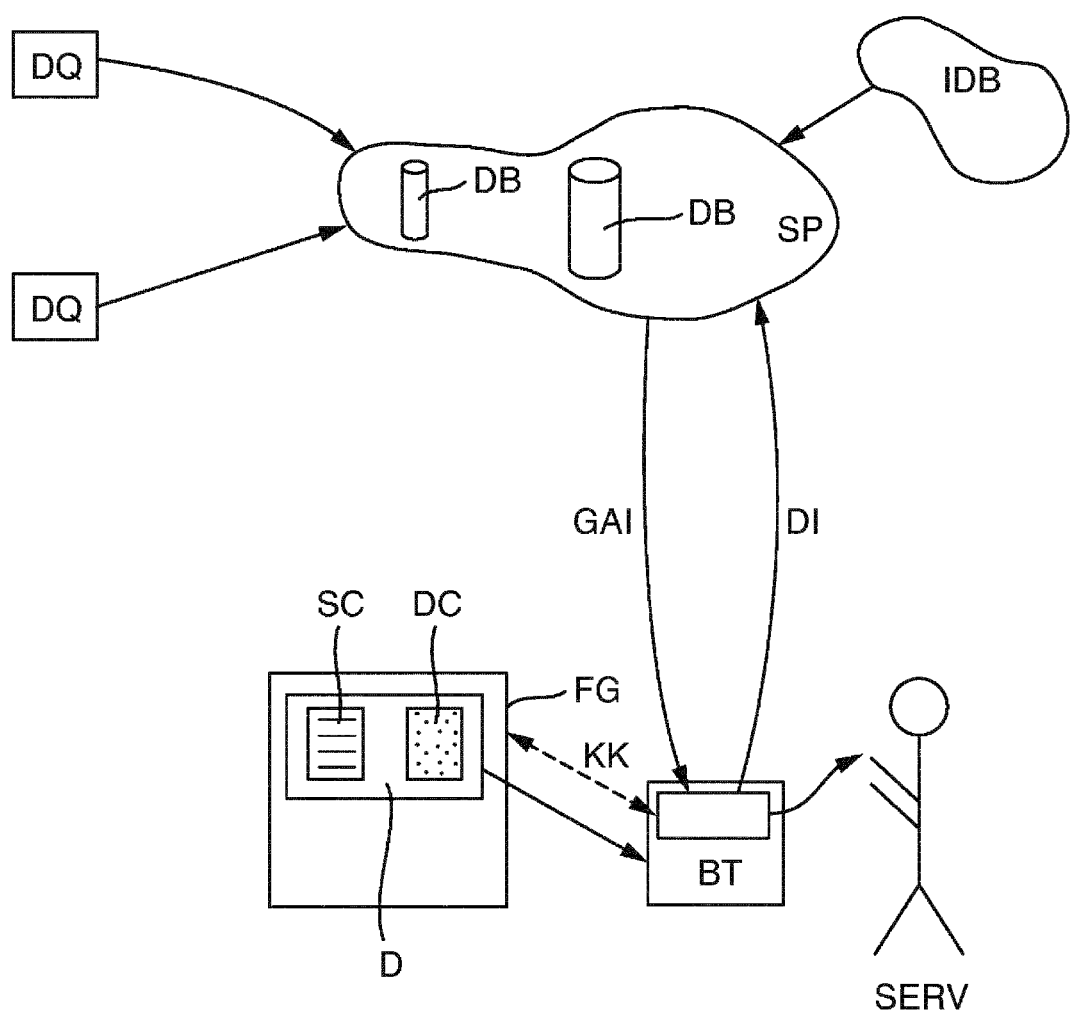

METHOD FOR STARTING UP OR SERVICING AN AUTOMATION FIELD DEVICE

CROSS-REFERENCE TO RELATED APPLICATIONS

The present application is related to and claims the priority benefit of German Patent Application No. 10 2016 124 146.6, filed on Dec. 13, 2016 and International Patent Application No. PCT/EP2017/077752 filed on Oct. 30, 2017, the entire contents of which are incorporated herein by reference.

TECHNICAL FIELD

The invention relates to a method for starting up or servicing a field device for determining or monitoring a physical or chemical process variable of a medium in an automation process.

BACKGROUND

In automation systems, especially in process automation systems, field devices are often used to record and/or influence process variables. To record process variables, sensors are used, which are, for example, integrated in fill-level meters, flow meters, pressure and temperature meters, pH redox potential meters, conductivity meters, etc., which record the corresponding process variables of fill-level, flow, pressure, temperature, pH value or conductivity. Actuators, such as, for example, valves or pumps, are used to influence process variables. The flow rate of a fluid in a pipeline section or a fill-level in a container can thus be altered by means of actuators. Field devices, in general, refer to all devices which are process-oriented and which supply or process process-relevant information. In connection with the invention, field devices also include remote I/O's, radio adapters, and general devices that are arranged at the field level. A variety of such field devices are manufactured and marketed by the Endress+Hauser company.

In modern industrial plants, communication between at least one higher-level control unit and the field devices usually takes place via a bus system such as Profibus® PA, Foundation Fieldbus®, or HART®. The bus systems can be designed to be both wired and wireless. The higher-level control unit is used for process control, process visualization, process monitoring, and the starting up and operation of the field devices, and is also referred to as a configuration/management system. Equipping field devices with Internet interfaces for communications and/or energy supply has also become known. In many applications, a so-called "edge device" is provided; this is responsible for the communication with the Internet for a defined group of field devices.

In automation technology, each field device is assigned unique identification information. For example, a unique serial number is assigned to each field device for the purpose of unique identification. It has also become known that, on a display assigned to the field device, a static—that is, unchanged over time—optically-readable code is displayed, which also serves to uniquely identify the field device. The reading can be performed visually by the operating personnel or automatically via a corresponding reading and/or operating tool—for example, a barcode reader.

It is also known that the operating personnel are provided with information from Internet-based sources during the starting up or servicing of a field device. Such information is suitable for simplifying the starting up or servicing of the field device on-site.

SUMMARY

The invention is based upon the aim of proposing a method that enables secure data transmission between a field device and a reading and/or operating tool.

The aim is achieved by a method for starting up or servicing a field device for determining or monitoring a physical or chemical process variable of a medium in an automation process, wherein the method comprises, in particular, the following method steps:

reading unique identification information, which is assigned to the field device, via a static code by means of a reading and/or operating tool;

optically reading diagnostic information, which is stored in the field device and which relates to at least one current and/or past event assigned to the field device, via a dynamic code generated by the field device by means of the reading and/or operating tool;

transmitting the identification and diagnostic information from the reading and/or operating tool to a cloud-based service platform, transmitting device and/or application-specific information for handling the event characterized by the diagnostic information, from the cloud-based service platform to the reading and/or operating tool, remedying the event or effects of the event using the transmitted device-specific information.

The event can, for example, be an error alarm, an initial or further starting up, or a reset of the field device. However, it can also be a routine servicing request, for example.

With the method according to the invention, it is possible to optically read out at least one dynamic code, in addition to the identification of the field device, via at least one static, machine-readable, optical code. Preferably, the at least one dynamic code contains information regarding the device status; this comprises, in particular, diagnostic or status information, history data—that is, data that is assigned to the field device during the lifetime of the field device—parameterization or configuration data, measurement data of the field device. Such information or data can be optically transmitted according to the invention without the need to establish a usual communications connection (wireless or wired) to the field device. Since the transmission path is unidirectional and limited to the transmission of information from the field device to the reading and/or operating tool, the integrity of the field device is ensured at all times. Given the unidirectional transmission path, unauthorized manipulations of the field device can be effectively avoided.

According to an advantageous additional embodiment of the invention, in or via the service platform, device-specific and/or application-specific information about the field device to be started up or serviced is compiled from several data sources. In addition to the at least one database of the cloud-based service platform, manufacturer-specific databases in particular, customer-specific databases, and/or publicly accessible Internet databases are used as data sources.

Preferably, at least one of the following device-specific and/or application-specific items of information is transmitted from the service platform to the reading and/or operating tool in order to remedy the event indicated by the diagnostic information:

Device-specific history, production, and/or engineering data,

Field device parameters classified as critical,

Parameters classified as critical of the process in which the field device is installed (in the case of radar level measurement, critical parameters are, for example, the formation of foam in the medium or the presence of an agitator), Instructions for replacing a component of the field device and corresponding purchase options, Instructions for replacing the field device and corresponding purchase options, Instructions for contacting a service technician, General service information.

An advantageous design of the method according to the invention provides that a data matrix code, a QR code, or a barcode be used as the static code. A flicker code or a 2-D flicker code is, in particular, used as the dynamic code.

Furthermore, in connection with the method according to the invention, it is proposed that the static code and/or the dynamic code be/will be read using a reading and/or operating tool equipped with image analysis software. For example, a diagnostic message can thus be read from the field device display using the image analysis software—in fact, both online and offline.

In addition, it is proposed that the static code be read via a reading module for an RF-ID chip.

In particular, a handheld, a smartphone, a tablet or a mobile terminal, especially a laptop—possibly with a camera—or an operating tool specially developed for automation technology for operating field devices is used as the reading and/or operating tool.

According to a preferred design of the method according to the invention, it is provided that status information read out via the dynamic code be stored on the reading and/or operating tool and/or displayed selectively if no communications connection to the cloud-based service platform can currently be established.

It was previously already emphasized that the method according to the invention ensures the integrity of the field device, since the transmission path is unidirectional from the field device to the reading and/or operating tool. An advantageous embodiment of the method according to the invention provides that a back transmission path or a back communications channel between the reading and/or operating tool and the field device be enabled via the optical reading of the dynamic code, which is usually carried out on-site by the service personnel. Subsequently, it is possible for the service personnel to make changes to the field device via the reading and/or operating tool, e.g., a reset can be undertaken, or one or more of the adjustable parameters of the field device can be changed.

In the following, a brief outline is given of the individual method steps of a preferred design of the method according to the invention:

Electronic identification of the field device by means of code scanning of the type plate via a portable reading and/or operating tool with an Internet connection, Electronic reading of a status or diagnostic message by means of code scanning—preferably, via the same portable reading and/or
operating tool with an Internet connection, Loading of device- and/or application-specific information and, if necessary, remedial measures suitable for the field device and the status or diagnostic message, e.g., via manufacturer-specific databases, generally available Internet sources, cloud-based databases, customer-specific databases, Transfer of device-specific and/or application-specific information via the
Internet to the reading and/or operating tool.

The remedial measures comprise, for example, the following:

Checking critical parameters of the field device

Checking defined parameters of the process or application in which the field device is installed Replacement of assemblies/spare parts of the field device Replacement of the field device Purchase options for an assembly/a spare part/a field device General service information Optionally, information can be imparted to a qualified service technician. The scanned information is transferred to a specialized service technician if the information provided by the service platform to the service personnel on-site is not sufficient.

It is possible to scan additional device information on the field device display on the basis of the recommended remedial measures, e.g., critical parameters, measured value records, and/or diagnostic messages on the field device that occurred in the past (optional).

In summary, the advantages of the solution according to the invention are, in particular, the following: Based upon the—primarily—unidirectional optical transmission path from the field device to a reading and/or operating tool with an Internet connection, a manipulation of the field device—at least via remote access from the Internet—to the reading and/or operating tool, and thus to the field device, is ruled out. Furthermore, remedial measures that are specific to the field device and application and correspond to the transmitted diagnostic message can be provided. The occurrence of transmission errors due to faulty visual reading, understanding, or transmission of the information displayed on the field device by service personnel is ruled out.

BRIEF DESCRIPTION OF THE DRAWING

The invention is explained in more detail in FIG. 1. FIG. 1 schematically shows a system that is suitable for carrying out the method according to the invention for starting up or servicing a field device FG for determining or monitoring a physical or chemical process variable of a medium in an automation process. Examples of field devices are already specified in the introduction to the description.

DETAILED DESCRIPTION

The field device FG has a display D. A static code SC is read out via a reading and/or operating tool BT, which static code contains unique identification information ID of the field device FG. In addition to the static code SC, a dynamic code DC can also be displayed on the display D of the field device FG. This dynamic code DC is also optically scanned or read out via the reading and/or operating tool BT. For example, the dynamic code DC contains diagnostic information DI that refers to at least one current and/or one past event that is to be assigned to the field device FG.

In an additional method step, the identification information ID and, for example, the status and/or diagnostic information DI are transmitted from the reading and/or operating tool BT to a cloud-based service platform SP. In or via the service platform SP, device-specific and/or application-specific information GAI about the field device FG to be started up or serviced is preferably compiled from several data sources DQ. The data sources comprise, for example, at least one database DB of the cloud-based service platform SP; however, in addition or alternatively, they can also comprise manufacturer-specific databases, customer-specific databases, and/or publicly accessible Internet databases IDB.

The device- and/or application-specific information GAI, suitable for the field device FG, for remedying the event characterized by the diagnostic information DI, e.g., an error message, is transmitted from the cloud-based service platform SP to the reading and/or operating tool BT. The event or effects of the event are remedied using the transmitted device-specific and/or application-specific information GAI. Usually, the proposed remedial measures can be carried out directly by service personnel Serv. In complicated cases, it is proposed that service personnel Serv consult services of a specialist service technician.

At a previous point, it was emphasized that the unauthorized manipulation of the field device FG is ruled out, since the transmission path from the field device FG to the reading and/or operating tool is unidirectional. In certain cases, however, it may also be necessary to activate a back communications channel KK between the field device FG and the reading and/or operating tool BT via the optical reading of the dynamic code DC. This subsequently makes it possible to, for example, change one or more parameters of the field device FG using the reading and/or operating tool.

The invention claimed is:

1. A method for starting up or servicing a field device for determining or monitoring a physical or chemical process variable of a medium in an automation process, comprising:
   reading unique identification information assigned to the field device via a static code using a reading and/or operating tool;
   generating in the field device and displaying on a display of the field device a dynamic code containing diagnostic information that is stored in the field device and that relates to at least one current and/or past event assigned to the field device;
   optically reading the diagnostic information from the dynamic code using the reading and/or operating tool, wherein the optical reading of the diagnostic information is a unidirectional transmission of information from the field device to the reading and/or operating tool;
   transmitting the identification and diagnostic information from the reading and/or operating tool to a cloud-based service platform;
   transmitting device and/or application-specific information for remedying the event characterized by the diagnostic information from the cloud-based service platform to the reading and/or operating tool; and
   remedying the event or effects of the event using the transmitted device-specific and/or application-specific information.

2. The method according to claim 1,
wherein, in or via the cloud-based service platform, device-specific and/or application-specific information about the field device to be started up or serviced is compiled from several data sources.

3. The method according to claim 2,
wherein the several data sources include a database of the cloud-based service platform, manufacturer-specific databases, customer-specific databases, and publicly accessible Internet databases.

4. The method according to claim 1,
wherein at least one of the following device-specific and/or application-specific items of information is transmitted from the cloud-based service platform to the reading and/or operating tool in order to remedy the event indicated by the diagnostic information:
   device-specific history, production, and/or engineering data;
   parameters of the field device classified as critical;
   parameters of the process or application classified as critical in which the field device is installed;
   instructions for replacing a component of the field device and corresponding purchase options;
   instructions for replacing the field device and corresponding purchase options;
   instructions for contacting a service technician; and
   general service information.

5. The method according to claim 1,
wherein a data matrix code, a QR code, or a barcode is used as the static code.

6. The method according to claim 1,
wherein a flicker code or a 2-D flicker code is used as the dynamic code.

7. Method according to claim 1,
wherein the static code and/or the dynamic code is/will be read out using the reading and/or operating tool equipped with image analysis software.

8. The method according to claim 1,
wherein the static code is read out via a reading module for an RF-ID chip.

9. The method according to claim 1,
wherein the reading and/or operating tool includes a handheld, a smartphone, a tablet, a mobile terminal, a laptop with a camera, or an operating tool specially developed for automation technology.

10. The method according to claim 1,
wherein the diagnostic information read out via the dynamic code is stored on the reading and/or operating tool if no communications connection to the service platform can be established.

11. The method according to claim 1, further comprising:
enabling a communications channel between the field device and the reading and/or operating tool via the optical reading of the dynamic code.

* * * * *